United States Patent [19]

Iwashita

[11] Patent Number: 5,448,145
[45] Date of Patent: Sep. 5, 1995

[54] FEEDFORWARD CONTROL METHOD FOR A SERVOMOTOR

[75] Inventor: Yasusuke Iwashita, Minamitsuru, Japan

[73] Assignee: Fanuc Ltd., Minamitsuru, Japan

[21] Appl. No.: 292,762

[22] Filed: Aug. 19, 1994

Related U.S. Application Data

[63] Continuation of Ser. No. 50,436, Jul. 2, 1993, abandoned.

Foreign Application Priority Data

Sep. 9, 1991 [JP] Japan ................. 3-255977

[51] Int. Cl.⁶ .......................................... G05B 19/407
[52] U.S. Cl. ....................... 318/568.15; 318/568.22; 318/590; 318/632
[58] Field of Search ............... 318/560, 561, 562, 563, 318/564, 565, 569, 590–596, 567, 568, 568.15, 568.22, 568.11, 432, 434, 568.1, 632–633

[56] References Cited

U.S. PATENT DOCUMENTS

| | | | |
|---|---|---|---|
| 4,510,565 | 4/1985 | Dummermuth . | |
| 4,533,991 | 8/1985 | Georgis | 318/561 |
| 5,055,761 | 10/1991 | Mills | 318/696 |
| 5,073,747 | 12/1991 | Dupraz et al. | 318/609 X |
| 5,107,193 | 4/1992 | Iwashita | 318/560 |
| 5,311,110 | 5/1994 | Iwashita | 318/568.15 |
| 5,331,263 | 7/1994 | Sagae et al. | 318/560 |

FOREIGN PATENT DOCUMENTS

| | | |
|---|---|---|
| 0016604 | 10/1980 | European Pat. Off. . |
| 0025651 | 3/1981 | European Pat. Off. . |
| 0176600 | 4/1986 | European Pat. Off. . |
| 0299080 | 1/1989 | European Pat. Off. . |
| 3708266 | 9/1987 | Germany . |
| 63-75907 | 4/1988 | Japan . |
| 63-205709 | 8/1988 | Japan . |
| 63-308613 | 12/1988 | Japan . |
| 2-143605 | 12/1990 | Japan . |
| 2-309402 | 12/1990 | Japan . |
| 3-084603 | 4/1991 | Japan . |
| 3-110603 | 5/1991 | Japan . |
| 1189959 | 4/1970 | United Kingdom . |

*Primary Examiner*—David S. Martin
*Attorney, Agent, or Firm*—Staas & Halsey

[57] ABSTRACT

A feedforward control method for a servomotor designed to improve with the command follow-up property of a servo system. In this method, the average value of move commands for N number of position/speed loop processing periods centering around the position/speed loop processing period concerned is obtained, the number N being equal to the number obtained by dividing the distribution period by the position/speed loop processing periods. A position feedforward amount FFp is obtained by multiplying this average value by a position feedforward coefficient, and a corrected speed command Vc(j) is obtained by adding this position feedforward amount FFp to a speed command obtained in a conventional position loop processing. Further, a speed feedforward processing is executed (S16), a torque command Tc(j) is obtained, and the motor is thereby driven. This feedforward control never causes any variation in the position deviation or any shock on the motor or machine.

10 Claims, 8 Drawing Sheets

FEEDFORWARD CONTROL METHOD FOR A SERVOMOTOR

This application is a continuation of application Ser. No. 08/050,436, filed Jul. 2, 1993, now abandoned.

BACKGROUND OF THE INVENTION

TECHNICAL FIELD

1. Field of the Invention

The present invention relates to a control method for a servomotor for driving a feed shaft of a machine tool or a robot arm, and more particularly, to a feedforward control method for a servomotor.

2. Description of the Related Art

In controlling a feed shaft of a machine tool or a robot arm by means of a servomotor, feedforward control is used in order to reduce the position deviation. When using the machine tool for high-speed cutting, in particular, shape errors are liable to be caused by a follow-up delay of a servo system. Thus, a position loop is feedforward-controlled to reduce these errors.

In the conventional feedforward control, variation of a move command for each position and speed processing period is differentiated, and a value obtained by multiplying the resulting differential value by a feedforward coefficient is added to a speed command obtained in a conventional position loop processing, thereby correcting the speed command. A speed loop processing is executed in accordance with the corrected speed command to reduce the position deviation, thereby correcting the servo delay.

However, a distribution period (ITP period) during which the move command is delivered from a numerical control device to a servo circuit side, that is, during a position loop, is about 8 msec, yet the period to execute a position/speed loop process in the servo circuit is only 2 or 1 msec. The position loop is therefore controlled so that the ITP period, during which the move command is delivered from the numerical control device, is divided into position loop periods, Ts and move commands for the individual divided position loop periods are equal. Thus, even though an acceleration/deceleration time constant is given to the move command outputted from the numerical control device, the position loop is controlled so that the move commands for individual position loop processing periods Tp in each ITP period are equal. Accordingly, a great difference is produced between the move commands for the position loop processing periods at the turning of the ITP periods, and this is differentiated into a great value by means of a feedforward term. Thus, the speed command contains a high-frequency component, which cannot be followed up in a speed loop. As a result, the position deviation is subject to variation, causing a great shock on the action of the motor or machine.

In order to eliminate this drawback, the inventor hereof filed an international application (PCT/JP90/00380) for the following invention, which was internationally published as International Publication No. WO90/11562. According to this invention, an acceleration/deceleration processing is inserted in a feedforward term for speed control, as well as for position control, and a smoothing processing is executed to remove the variation. In this smoothing operation, past data are leveled, and a time delay is equivalently caused in the feedforward term.

SUMMARY OF THE INVENTION

According to the present invention, the average value of move commands for N number of position/speed loop processing periods centering around a position/speed loop processing period of the present processing period is obtained, where N is the number of the position/speed loop processing periods by which an ITP period is divided, and a corrected speed command for a speed loop processing is obtained by adding a position feedforward amount, which is obtained by multiplying the average value by a position feedforward coefficient, to a speed command obtained in a position loop processing.

Further, the differential value of the average value for the position/speed loop processing of a period, which is later than the position/speed loop period for the present processing by being advanced by a preset number of periods, is obtained, and a torque command for the servomotor is obtained by adding a speed feedforward amount, which is obtained by multiplying the differential value by a speed feedforward coefficient, to a torque command value obtained in the speed loop processing.

A move command for an ITP period one cycle later than the ITP period for the present processing are previously read so that the move command for the position/speed loop processing period is obtained beforehand. A position feedforward amount FFp is obtained by using an average value b(j) of move commands for N number of periods centering around a position/speed loop processing period j, where N is the value obtained by dividing the ITP by the number of the position/speed loop processing periods which $\alpha 1$ is the position feedforward coefficient, P is a coefficient for converting the unit of move command pulses into a speed command unit, and a(j) is a move command for the period j. Normally, however, 8 msec and 1 or 2 msec are used for the ITP period and the position/speed loop period, respectively, so that the number N is an even number. Based on the position/speed loop processing period j concerned, therefore, the position feedforward amount FFp is obtained in accordance with an average value for a range from a period $(N/2-1)$ cycles later than the period j to an N/2-cycle-earlier period, or from an N/2-cycle-later period to an $(N/2-1)$-cycle-earlier period.

The average value b(j) for the range from the $(N/2-1)$-cycle-later to the N/2-cycle-earlier period is given by the following equation (1).

$$b(j) = \left\{ \sum_{K=-\frac{N}{2}+1}^{\frac{N}{2}} a(j-k) \right\} / N. \tag{1}$$

The average value b(j)' for the range from the N/2 cycle-later period to the $(N/2-1)$-cycle-earlier period is given by the following equation (2).

$$b(j)' = \left\{ \sum_{K=-\frac{N}{2}}^{\frac{N}{2}-1} a(j-k) \right\} / 4. \tag{2}$$

The position feedforward amount FFp is obtained by multiplying the aforesaid average value b(j) by the coefficients P and $\alpha 1$, as indicated by equation (3) as follows:

$$FFp = \alpha 1 \cdot P \cdot b(j). \qquad (3)$$

Alternatively, the feedforward amount FFp may be obtained by using the aforesaid average value $b(j)'$ in like manner.

Further, the position feedforward amount FFp may be obtained by taking the weighted average, that is, $b(j)'' = \{b(j) + b(j)'\}/2$, of the aforesaid average values $b(j)$ and $b(j)'$ and multiplying it by the coefficients P and $\alpha 1$.

The position feedforward amount FFp obtained by making the calculation according to equation (1) or (2), or on the basis of the weighted average of values obtained by making the calculations according to equations (1) and (2) is added to the speed command obtained in the position loop processing for the period j concerned, and the resulting sum is used as a speed command for the speed loop processing.

Furthermore, a speed feedforward amount FFv is obtained according to the following equation (4) by multiplying the differential value of an average value $b(j+L)$ for a period advanced by L number of cycles, obtained according to equation (1) and the like, by the coefficient P for converting the unit of the move command pulses into the speed command unit, the speed feedforward coefficient $\alpha 2$, and a coefficient P' for converting the unit of the move command pulses into a current unit.

$$FFv = \alpha 2 \cdot P \cdot P' \{b(j+L) - b(j+L-1)\}. \qquad (4)$$

The torque command for the servomotor is obtained by adding the speed feedforward amount FFv, obtained according to equation (4), to the torque command (current command) obtained in the speed loop processing.

DETAILED DESCRIPTION OF THE PREFERRED EMBODIMENT

Figure 1:
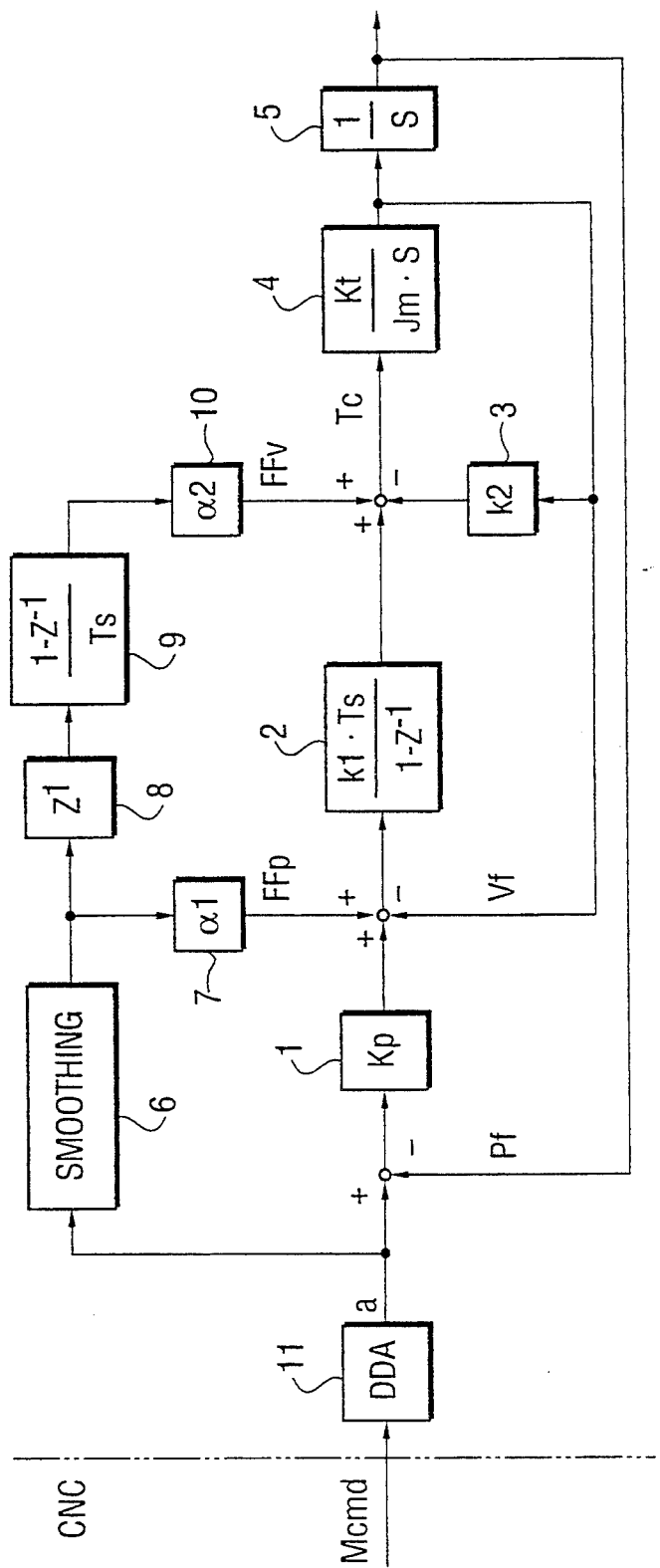
FIG. 1 is a block diagram of a servo system showing one embodiment of the present invention.

FIG. 1 is a block diagram of a servo system according to one embodiment of the present invention. In FIG. 1, Kp of a transfer function 1 represents a position gain of a position loop; a transfer function 2, an integral term of a speed loop; Ts, the period of a position/speed loop processing; and k1, an integral gain of the speed loop. Also, k2 of a transfer function 3 represents a proportional gain; 4, a mechanical section of a servomotor; Kt, a torque constant; and Jm, inertia. A transfer function 5 integrates the rotating speed of the servomotor, thereby computing the position. Further, a smoothing circuit 6 and a term 7 for multiplication by the position feedforward coefficient $\alpha 1$ are terms for position feedforward.

A transfer function 8 advances the output of the smoothing circuit 6 by a predetermined number of position/speed loop processing periods. Numerals 9 and 10 designate a transfer function for differentiation and a term for multiplication by the speed feedforward coefficient $\alpha 2$, respectively. The elements 8, 9 and 10 are used for speed feedforward control. A DDA (digital differential analyzer) 11 divides a move command Mcmd, which is delivered from a CNC (computerized numerical control device) with every distribution period (ITP period), into move commands a for the individual position/speed loop processing periods.

Of the transfer functions described above, the transfer functions 2, 8 and 9 are represented in a discrete value control system.

The move command Mcmd for each ITP period is delivered from the CNC as a host control device, and a move command a for the position/speed loop period is obtained by means of the DDA 11. In order to obtain the feedforward amount FFp by means of the elements 6 and 7, it is necessary to obtain a move command for the ITP period of one cycle later in advance, so that the move command for the one-cycle-later ITP period is obtained beforehand by means of the DDA 11.

The move command a for the position/speed loop processing for executing the processing concerned is obtained, and a position deviation is obtained by subtracting a feedback amount Pf of the actual movement of the servomotor from the move command a for the position/speed loop period concerned. A speed command is obtained by adding, to the value obtained by multiplying the positional deviation by the positional gain Kp, the position feedforward amount FFp, which is obtained by making the calculation according to equation (1) or (2) by means of the elements 6 and 7 or on the basis of the weighted average of values obtained by making the calculations according to equations (1) and (2).

A speed deviation is obtained by subtracting a feedback amount Vf of the actual speed of the servomotor from the speed command; a value obtained by multiplying the actual speed Vf of the servomotor by a proportional constant k2 is subtracted from a value obtained by integrating the speed deviation by means of the element 2; and a torque command is obtained by subjecting the resulting value to the same integral and proportional speed loop processings as the conventional ones.

Further, the speed feedforward amount FFv is obtained by making the calculation according to equation (4) by means of the elements 8, 9 and 10; a feedforward-controlled torque command Tc is obtained by adding this speed feedforward amount FFv to the torque command which is obtained by the conventional processings; and the servomotor is driven.

Figure 2:
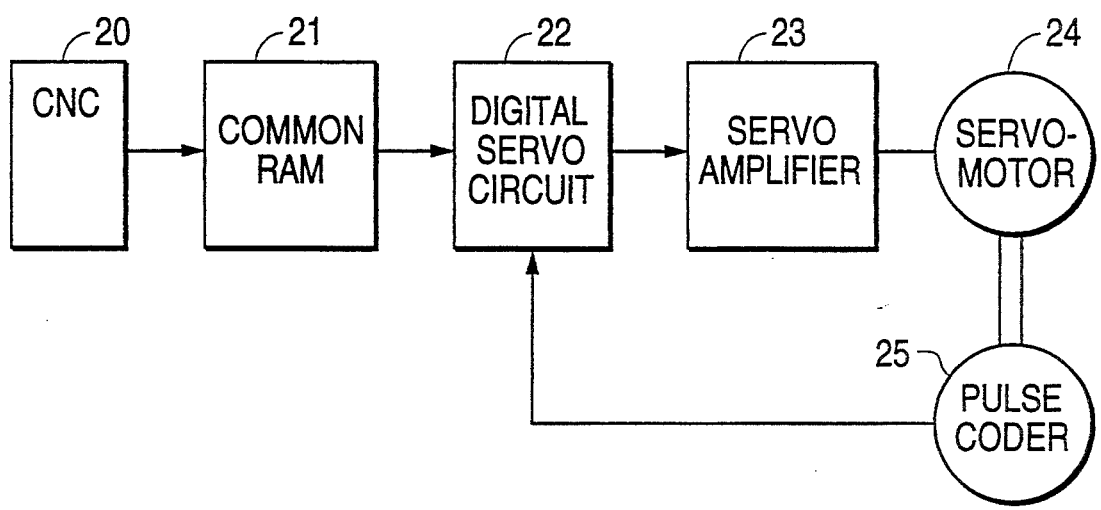
FIG. 2 is a block diagram of a digital servo control device for carrying out the embodiment.

FIG. 2 is a block diagram of a digital servo control device for carrying out one embodiment of a method according to the present invention. Since this device is arranged in the same manner as a conventional device for digital servo control, it is illustrated schematically.

In FIG. 2, numeral 20 denotes a computerized numerical control device (CNC); 21, a common RAM; 22, a digital servo circuit including a CPU, ROM, RAM, etc.; 23, a servo amplifier such as a transistor inverter; 24, a servomotor; and 25, a pulse coder which generates pulses as the servomotor 24 rotates.

The CNC 20 writes the move command Mcmd, which is supplied with every ITP period (distribution period), in the common RAM 21, and the CPU of the digital servo circuit 22 reads this move command Mcmd from the common RAM 21, and executes the position/speed loop processing with the period Ts (ITP=Ts·N) which is obtained by dividing the ITP period into N number of equal parts. The move command a(j) for the position/speed loop processing Ts is obtained so that the move command Mcmd delivered from the NC 20 with every ITP period is equally distributed during the ITP period. A position loop processing is executed on the basis of the difference between the move command a(j) and the present position of the servomotor 24, which is obtained according to feedback pulses from the pulse coder 25, and a position feedforward control processing (mentioned later) is executed to obtain a speed command. Then, a speed feedforward processing, as well as a speed loop processing, is executed in accordance with the speed command and the actual speed of the servomotor 24, which is obtained according to the feedback pulses from the pulse coder 25, and a torque command (current command) is obtained. Further, a current feedforward processing, as well as a current loop processing, is executed; a PWM command is created; and the servomotor 24 is driven by means of the servo amplifier 23.

Figure 3:
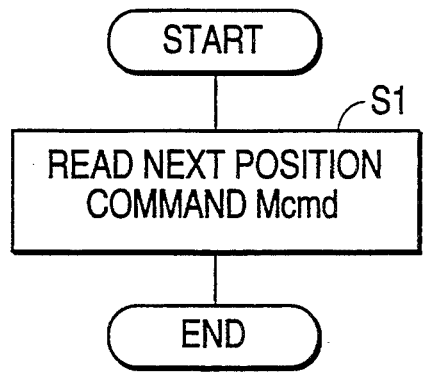
FIG. 3 is a flow chart showing a processing executed by a processor of a digital servo circuit for every ITP period.
Figure 4:
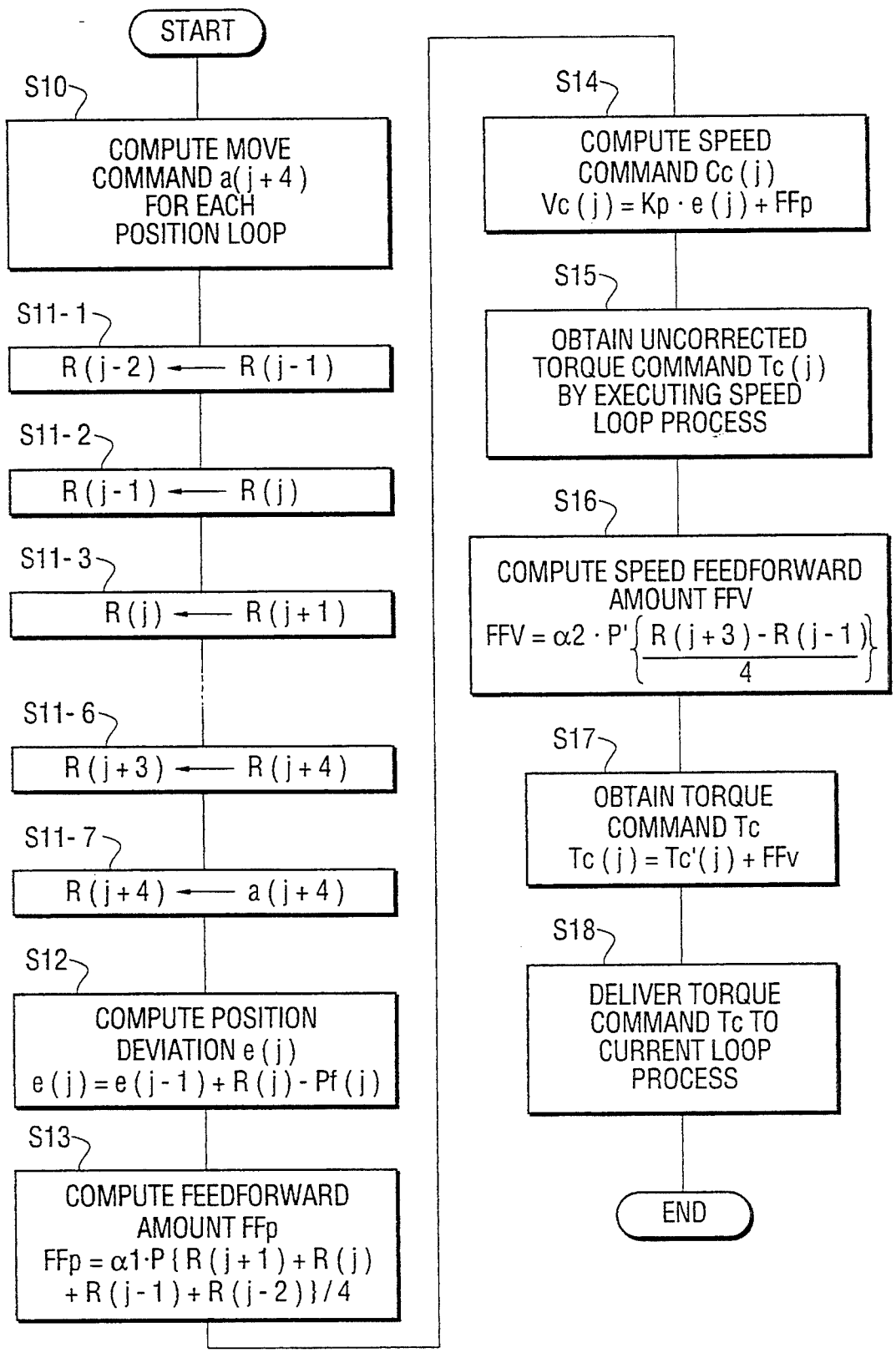
FIG. 4 is a flow chart showing a position/speed loop processing.

FIGS. 3 and 4 are flow charts showing a move command reading processing for each ITP period, which is executed by the CPU of the digital servo circuit 22, and the position/speed loop processing for each position/speed loop processing period, respectively.

In the present embodiment, the position/speed loop processing is executed with the ITP period divided into four (parts) (N=4). In order to obtain the position feedforward amount FFp, the b(j) obtained by the aforesaid equation (1) by smoothing circuit 6 is used as the average value of move commands of N number of periods centering around the period concerned. The following is a description of a case of the speed feedforward processing with an advance of two periods (L=2). Thus, the average value b(j) of the move commands is given by the following equation (5), and the feedforward amount FFp is given by equation (6).

$$b(j) = \left\{ \sum_{K=-1}^{2} a(j-k) \right\}/4 \quad (5)$$

$$= \{a(j+1) + a(j) + a(j-1) + a(j-2)\}/4$$

$$FFp = \alpha 1 \cdot P \cdot b(j) \quad (6)$$

$$= \alpha 1 \cdot P\{a(j+1) + a(j) + a(j-1) + a(j-2)\}/4$$

According to equation (4), the speed feedforward amount FFv is given by the following equation (7):

$$FFv = \alpha 2 \cdot P \cdot P\{b(j+2) - b(j+1)\} \quad (7)$$

$$= \alpha 2 \cdot P \cdot P\{a(j+3) - a(j-1)\}/4$$

Referring to the flow charts of FIGS. 3 and 4, the position/speed loop processing executed by the CPU of the digital servo circuit 22 will be described in connection with the above-described case as an example.

First, in Step S1, the CPU reads from the common RAM 21 the one-cycle-later move command Mcmd delivered from the NC 20 with every ITP period. Actually, the position/speed loop processing which will be described later, is executed in response to a move command for the ITP period of one cycle later, so that the move command Mcmd delivered from the NC 20 with every ITP period is read out.

Subsequently, the CPU starts a processing shown in FIG. 4 for every position/speed loop processing period. First, in Step S10, a move command a(j+4) for each position/speed loop is computed in accordance with the distributed move command Mcmd read with every ITP period. Then, in Steps S11-1 to S11-7, the move command a(j+4) computed in Step S10 is loaded into a register R(j+4), and the respective storage contents of registers R(j−2) to R(j+4) are shifted by one each. More specifically, the storage contents of the registers R(j−1), R(j), R(j+1), R(j+2), R(j+3) and R(j+4) are stored in the registers R(j−2), R(j−1), R(j), R(j+1), R(j+2) and R(j+3), respectively. The storage content of each register is "0" before the distributed move command Mcmd is outputted.

Then, in Step S12, the move command a(j) for the present period stored in the register R(j) is added to a position deviation e(j−1) of the preceding position/speed loop period stored in the register (in Step S12), and a position feedback amount Pf(j) for the movement of the servomotor detected by means of the pulse coder 25 is subtracted to obtain a position deviation e(j) for the present period.

Since the move command Mcmd for the ITP period is read one cycle earlier, the move command a(j) for the position/speed loop period concerned is stored in the register R(j), the fourth immediate predecessor of the register R(j+4), which is loaded with the move command a(j+4) computed during the present period.

Then, in Step S13, the average value b(j) is obtained by making calculation according to equation (5) using the move commands a(j+1), a(j), a(j−1) and a(j−2) stored in the registers R(j+1), R(j), R(j−1) and R(j−2), respectively. The position feedforward amount FFp is obtained by multiplying the average value b(j) by the coefficients α1 and P.

In Step S14, a speed command Vc(j) is obtained by adding the position feedforward amount FFp, obtained in Step S13, to the product of the position deviation e(j), obtained in Step S12, and the position loop gain Kp. In Step S15, a torque command Tc'(j) is obtained by executing the same speed loop processing as the conventional one on the basis of the speed command Vc(j).

Then, in Step S16, the speed feedforward amount FFv is obtained by making calculation according to equation (7) using the move commands a(j+3) and a(j−1) stored in the registers R(j+3) and R(j−1), respectively.

Figure 5:
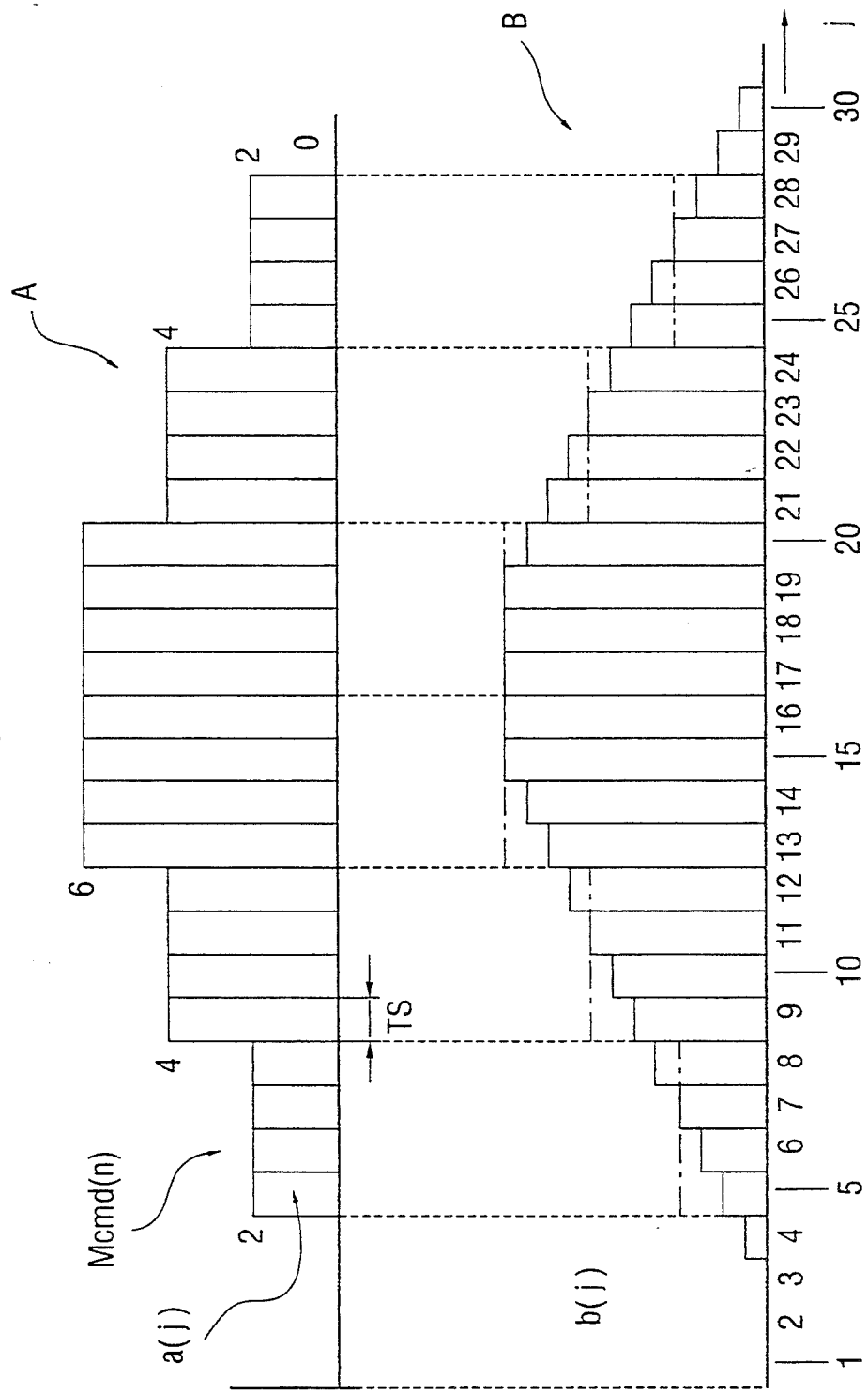
FIG. 5 is a diagram for illustrating average values of move commands for computing a position feedforward amount.
Figure 6:
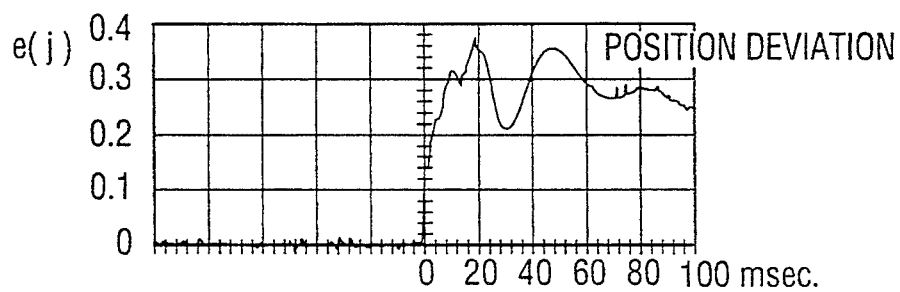
FIG. 6 is a graph showing the transition of a position deviation observed when ramp input is applied to the move commands in a conventional servo system for feedforward control.

Subsequently, the program proceeds to Step S17, whereupon correction is made by adding the speed feedforward amount FFv, computed in Step S16, to the torque command Tc'(j), obtained in Step S15, whereby a corrected torque command Tc(j) is obtained. In Step S18, the torque command Tc(j) is delivered to the current loop processing, whereupon the position/speed loop processing is finished. Table 1 and FIGS. 5 and 6 show an example of the present embodiment. Move commands Mcmd(n) for the individual ITP periods are inputted as indicated by A in FIG. 5, and the move command a(j) for each position/speed loop processing period is obtained from these commands. The average value b(j) is obtained from this move command a(j) as indicated by B in FIG. 5.

Table 1 shows the values of the move commands a(j+4) to a(j−2) stored in the registers R(j+4)) to R(j−2), and the average value b(j) respectively. Also shown are the average value b(j)' obtained according to equation (2), and the value b(j)" indicative of the weighted average of the average values b(j) and b(j)'.

by a coefficient is used, accordingly variation of the position deviation can be eliminated.

Figure 7:
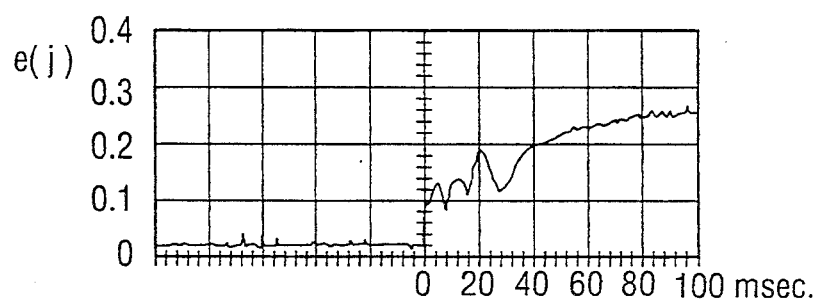
FIG. 7 is a graph showing the transition of a position deviation observed when ramp input is applied to the move commands with a lead L for speed feedforward control at 0 according to the one embodiment of the present invention.
Figure 8:
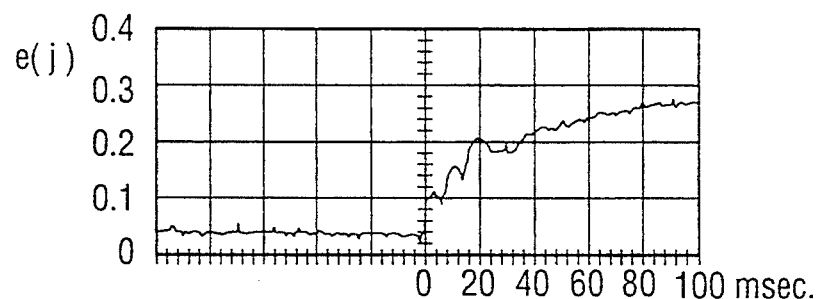
FIG. 8 is a graph showing the transition of a position deviation observed when ramp input is applied to the move commands with the lead L for the speed feedforward control at 2 according to the one embodiment of the present invention.

FIG. 6 is a graph obtained by detecting the position deviation when ramp input is applied to the move command in the case of the conventional feedforward control, in which the feedforward amount obtained by multiplying the differential value of the move command by the coefficient is used. FIG. 7 is a graph obtained by measuring the position deviation when ramp input is applied to the move command in the case where the data for the speed feedforward control according to the present invention is not advanced (L=0). FIG. 8 is a graph obtained by measuring the position deviation when the data according to the present invention is advanced for two periods (L=2). As seen from FIGS. 6 to 8, the feedforward control according to the present invention, compared to the conventional feedforward control, is improved in reducing the variation of the position deviation.

In the above embodiment, the move commands for the one-cycle-later (future) period (j+1), present period j, one-cycle-earlier (past) period j−1), and two-cycle-earlier cycle-earlier (past) period (j−2) of the present position/speed loop processing period j are leveled. Alternatively, however, the move commands for the periods (j+2), (j+1), j and (j−1) may be leveled according to equation (2). In this case, the average value is the value given by b(j)' in Table 1, and is shifted to the left by one period Ts as in FIG. 5b.

If the number N resulting from dividing the ITP

TABLE 1

| n | j | a(j+4) | a(j+3) | a(j+2) | a(j+1) | a(j) | a(j−1) | a(j−2) | b(j) | b(j)' | b(j)' |
|---|---|---|---|---|---|---|---|---|---|---|---|
| 1 | 1 | 2 | 0 | 0 | 0 | 0 | 0 | 0 | 0 | 0 | 0 |
|   | 2 | 2 | 2 | 0 | 0 | 0 | 0 | 0 | 0 | 0 | 0 |
|   | 3 | 2 | 2 | 2 | 0 | 0 | 0 | 0 | 0 | 1/2 | 1/4 |
|   | 4 | 2 | 2 | 2 | 2 | 0 | 0 | 0 | 1/2 | 1 | 3/4 |
| 2 | 5 | 4 | 2 | 2 | 2 | 2 | 0 | 0 | 1 | 3/2 | 5/4 |
|   | 6 | 4 | 4 | 2 | 2 | 2 | 2 | 0 | 3/2 | 2 | 7/4 |
|   | 7 | 4 | 4 | 4 | 2 | 2 | 2 | 2 | 2 | 5/2 | 9/4 |
|   | 8 | 4 | 4 | 4 | 4 | 2 | 2 | 2 | 5/2 | 3 | 11/4 |
| 3 | 9 | 6 | 4 | 4 | 4 | 4 | 2 | 2 | 3 | 7/2 | 13/4 |
|   | 10 | 6 | 6 | 4 | 4 | 4 | 4 | 2 | 7/2 | 4 | 15/4 |
|   | 11 | 6 | 6 | 6 | 4 | 4 | 4 | 4 | 4 | 9/2 | 17/4 |
|   | 12 | 6 | 6 | 6 | 6 | 4 | 4 | 4 | 9/2 | 5 | 19/4 |
| 4 | 13 | 6 | 6 | 6 | 6 | 6 | 4 | 4 | 5 | 11/2 | 21/4 |
|   | 14 | 6 | 6 | 6 | 6 | 6 | 6 | 4 | 11/2 | 6 | 23/4 |
|   | 15 | 6 | 6 | 6 | 6 | 6 | 6 | 6 | 6 | 6 | 6 |
|   | 16 | 6 | 6 | 6 | 6 | 6 | 6 | 6 | 6 | 6 | 6 |
| 5 | 17 | 4 | 6 | 6 | 6 | 6 | 6 | 6 | 6 | 6 | 6 |
|   | 18 | 4 | 4 | 6 | 6 | 6 | 6 | 6 | 6 | 6 | 6 |
|   | 19 | 4 | 4 | 4 | 6 | 6 | 6 | 6 | 6 | 11/2 | 23/4 |
|   | 20 | 4 | 4 | 4 | 4 | 6 | 6 | 6 | 11/2 | 5 | 21/4 |
| 6 | 21 | 2 | 4 | 4 | 4 | 4 | 6 | 6 | 5 | 9/2 | 19/4 |
|   | 22 | 2 | 2 | 4 | 4 | 4 | 4 | 6 | 9/2 | 4 | 17/4 |
|   | 23 | 2 | 2 | 2 | 4 | 4 | 4 | 4 | 4 | 7/2 | 15/4 |
|   | 24 | 2 | 2 | 2 | 2 | 4 | 4 | 4 | 7/2 | 3 | 13/4 |
| 7 | 25 | 0 | 2 | 2 | 2 | 2 | 4 | 4 | 3 | 5/2 | 11/4 |
|   | 26 | 0 | 0 | 2 | 2 | 2 | 2 | 4 | 5/2 | 2 | 9/4 |
|   | 27 | 0 | 0 | 0 | 2 | 2 | 2 | 2 | 2 | 3/2 | 7/4 |
|   | 28 | 0 | 0 | 0 | 0 | 2 | 2 | 2 | 3/2 | 1 | 5/4 |
| 8 | 29 | 0 | 0 | 0 | 0 | 0 | 2 | 2 | 1 | 1/2 | 3/4 |
|   | 30 | 0 | 0 | 0 | 0 | 0 | 0 | 2 | 1/2 | 0 | 1/4 |
|   | 31 | 0 | 0 | 0 | 0 | 0 | 0 | 0 | 0 | 0 | 0 |
|   | 32 | 0 | 0 | 0 | 0 | 0 | 0 | 0 | 0 | 0 | 0 |

As seen from FIG. 5 and Table 1, the average value b(j) and hence the position feedforward amount FFp, obtained on the basis thereof, undergo no sharp change even though the move command a(j) suddenly changes with every ITP period. Thus, the change is not so sharp as that in the case of the conventional feedforward control, in which a feedforward amount obtained by multiplying the differential value of the move command period by the position/speed loop periods is an even number, the position/speed loop period which is expected to be the center of leveling fails to be the exact center of the N number of position/speed loop periods. Thus, the position feedforward amount FFp leads or delays by half the length of the position/speed loop period. This phenomenon, which is evident from FIGS. 1 and 5, will now be described further in detail.

Figure 9A:
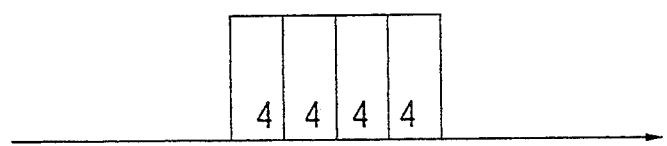
FIGS. 9A, 9B, 9C and 9D are illustrating average values obtained by a smoothing processing.
Figure 9B:
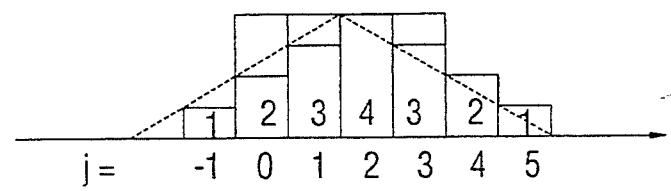
Figure 9C:
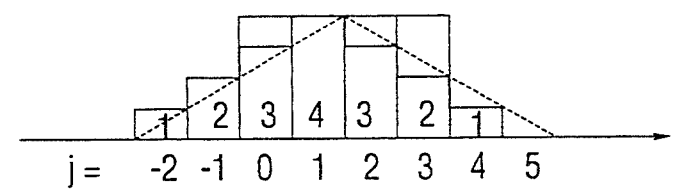
Figure 9D:
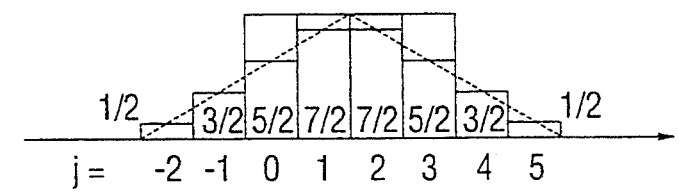

Let us suppose that four-by-four move commands Mcmd with the ITP period are delivered for one period, as shown in FIG. 9a. If the move command a for each period is obtained where j=0 for the position/speed loop period of the ITP period concerned, in obtaining the feedforward amount by taking the average according to equation (1), the average value varies in the order of 1, 2, 3, 4, 3, 2 and 1 as the period j varies from j=−1 to j=5, as shown in FIG. 9b. If the average value is obtained according to equation (2), on the other hand, it varies in the order of 1, 2, 3, 4, 3, 2 and 1 as the period j varies from j=−2 to j=4, as shown in FIG. 9c. Thus, a half-cycle delay and a half-cycle lead are caused in the cases of FIGS. 9b and 9c, respectively. Thereupon, if the weighted average b(j)" of the average value b(j) obtained according to equation (1) and the average value b(j)' obtained according to equation (2) is taken, it varies in the order of ½, 3/2, 5/2, 7/2, 7/2, 5/2, 3/2 and ½ as the period j varies from j=−2 to j=6, as shown in FIG. 9d. Therefore, the time delay and lead are eliminated equivalently.

Figure 10:
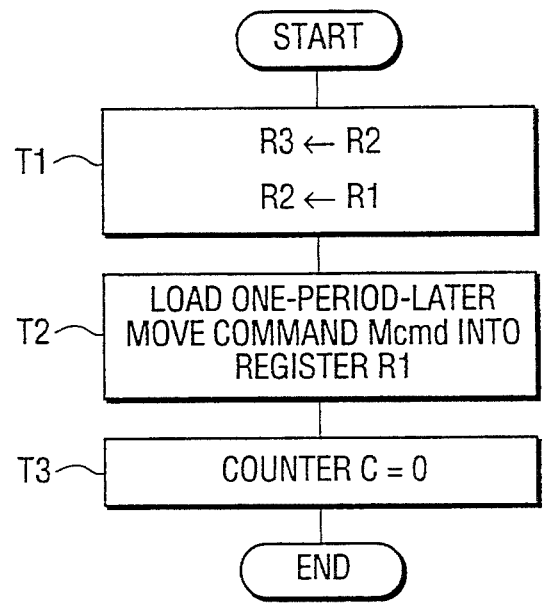
FIG. 10 is a flow chart showing a processing executed by a processor of a digital servo circuit according to an alternative embodiment of the present invention with every ITP period.
Figure 11:
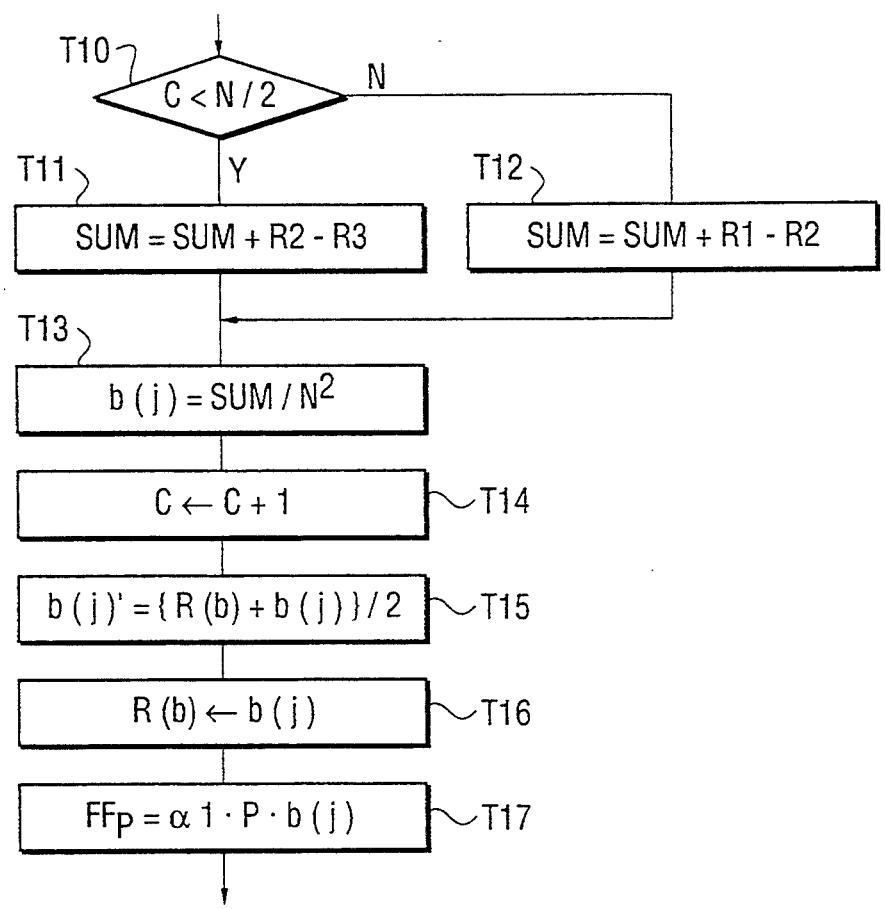
FIG. 11 is a flow chart showing a processing for obtaining position feedforward in a position/speed loop processing according to the alternative embodiment.

Referring now to FIGS. 10 and 11, an embodiment will be described as a case where the average value is obtained not from the move command a for the position/speed loop period, which can be obtained by means of the DDA 11, but from the move command Mcmd issued with every ITP period.

In this embodiment, a processing will be described for the case where the position feedforward amount FFp is obtained and controlled in accordance with the weighted average b(j)".

The CPU of the digital servo circuit 22 executes the processing of FIG. 10 with every distribution period. First, in Step T1, values stored individually in registers R2 and R1 are loaded into registers R3 and R2, respectively, and in Step T2, the one-cycle-later move command Mcmd read from the common RAM 21 is loaded into the register R1. Then, in Step T3, a counter T is cleared to "0". In this manner, a move command Mcmd for the period one cycle earlier (past) than the ITP period concerned is stored in the register R3; a move command Mcmd for the period concerned is stored in the register R2; and a one-cycle-later (future) move command Mcmd is stored in the register R1. Actually, however, it is necessary only that the values stored individually in the registers R2 and R1 be loaded into registers R3 and R2, respectively, and the distributed move command MCDM into the register R1. As will be described later, the position/speed loop processing is executed delaying by by one ITP period. For initialization, the registers R1 to R3 are first loaded with "0".

On the other hand, the CPU of the digital servo circuit 22 executes a processing shown in FIG. 11 after executing a computation processing (processing of Step S12 in FIG. 4) for the position deviation with every position/speed loop processing period. In FIG. 11, only a processing for obtaining the position feedforward amount is shown, and other processings are omitted.

First, in Step T10, it is determined whether or not the value in the counter C is smaller than ½ of the value N obtained by dividing the distribution period by the position/speed loop processing period. If the counter value is smaller than N/2, the program proceeds to Step T11, whereupon a value obtained by subtracting the value in the register R3 from the value in the register R2 is added to the value in an accumulator SUM. If the value in the counter C is not smaller than N/2, the program proceeds to Step T12, whereupon a value obtained by subtracting the value in the register R2 from the value in the register R1 is added to the value in the accumulator SUM, and the program then proceeds to Step T13. The accumulator SUM is initialized at "0".

In Step T13, the average value b(j) is obtained by dividing the value in the accumulator SUM by the square of the number N. Then, "1" is added to the value in the counter C in Step T14, whereupon the program proceeds to Step T15. In Step T15, the weighted average b(j)" is obtained by dividing by "2" the sum of a one-cycle-earlier average value stored in a register R(b) and the average value b(j) obtained in Step T13. Then, in Step T16, the average value b(j) obtained in Step T13 is loaded into the register R(b), whereupon the program proceeds to Step T17. In Step T17, the feedforward amount FFp is obtained by multiplying the weighted average b(j)", which is obtained in Step T15, by the position feedforward coefficient α1 and the coefficient P for converting the unit of the move command pulses into a speed command unit. Thereafter, the processing of Step S14 shown in FIG. 4 and the subsequent processings are executed. The speed feedforward amount FFv to be obtained in Step S17 is obtained by previously storing the weighted average b(j)" obtained in Step S15 and making the calculation according to equation (4).

Alternatively, Step T15 may be omitted so that the position feedforward amount FFp is obtained on the basis of the average value b(j), and whether or not the value in the counter C is not larger than N/2 may be determined in Step T10.

Among the processings described above, Steps T10 to T13 are processings for obtaining the average value b(j). The following is a description of the way these processings provide the average value of the move commands a for the N number of position/speed loop periods centering around the aforesaid position/speed loop period concerned.

Figure 12:
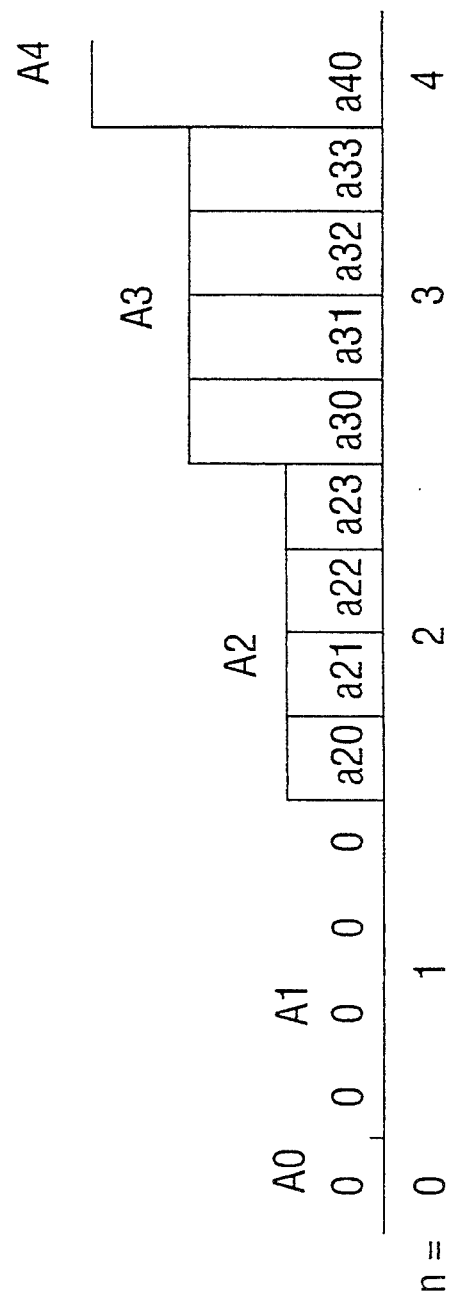
FIG. 12 is a diagram for illustrating a processing for obtaining average values.

Let us suppose, for example, that the move commands Mcmd for the individual ITP periods are outputted in the order of A0, A1, A2, A3, A4, . . . (A0=A1=0), as shown in FIG. 12. If move commands obtained by dividing A2 and A3 by every position/speed loop period are a20, a21, a22, a23; and a30, a31, a32, a33 (division number N=4), the average values obtained are as follows (Table 2).

TABLE 2

| n | Mcmd | C | SUM | b(j) |
|---|------|---|-----|------|
| 1 | A1 | 0 | 0+A1−A0=0 | 0 |
|   |    | 1 | 0+A1−A0=0 | 0 |
|   |    | 2 | 0+A2−A1=A2 | A2/16=a20/4 |
|   |    | 3 | A2+A2−A1=2 A2 | 2 A2/16=(a20+a21)/4 |
| 2 | A2 | 0 | 2 A2+A2−A1=3 A2 | 3 A2/16=(a20+a21+a22)/4 |
|   |    | 1 | 3 A2+A2−A1=4 A2 | 4 A2/16=(a20+a21+a22+a23)/4 |
|   |    | 2 | 4 A2+A3−A2=3 A2+A3 | (3 A2+A3)/16=(a21+a22+a23+a30)/4 |
|   |    | 3 | 3 A2+A3+A3−A2=2 A2+2 A3 | (2 A2+2 A3)/16=(a22+a23+a30+a31)/4 |

TABLE 2-continued

| n | Mcmd | C | SUM | b(j) |
|---|------|---|-----|------|
| 3 | A3 | 0 | 2 A2+2 A3+A3−A2=A2+3 A3 | (A2+3 A3)/16=(a23+a30+a31+a32)/4 |
|   |    | 1 | A2+3 A3+A3−A2=4 A3 | 4 A3/16=(a30+a31+a32+a33)/4 |
|   |    |   | ... | ... |

In this manner, the average value b(j) can be also obtained by the processings of Step T10 to T13. The feedforward amount FFp can be obtained without any delay or lead by taking the weighted average of the average value b(j) obtained in the position/speed loop period concerned and the average value obtained in the one-cycle-earlier position/speed loop period. In the example described above, the average value b(j) obtained in the first position/speed loop period (counter C=0) when the ITP period n is n=3 is based on the sum of the move command a30 for the position/speed loop period concerned, the move command a23 for the one-cycle-earlier period, and the move commands a31 and a32 for the one- and two-cycle-later periods. In other words, in this case, the calculation is made according to equation (2). On the other hand, the average value b(j) obtained in the one-cycle-earlier position/speed loop period (when n=2 and C=3) is based on the sum of the move command a30 for the position/speed loop period concerned, the move commands a23 and a22 for the one- and two-cycle-earlier periods, and the move command a31 for the one-cycle-later period, and the average value is obtained by making the calculation according to equation (1). Thus, the weighted average b(j)" can be obtained by adding the average value computed in the period concerned and the average value computed in the one-cycle-earlier period and dividing the resulting sum by 2.

In connection with the aforementioned embodiment, the ITP period has been described as being divided into four. However, it may be divided in any other number than four, provided that the move commands a for the N number of periods centering around the position/speed loop period concerned are leveled.

According to the present invention, even though the distributed move command from the host control device, such as the numerical control device, varies in stages, the variation of the position deviation deceases, so that a shock acting on the action of the motor or machine can be reduced. In the case where the number of the position/speed loop processing periods, which is obtained by dividing the distribution period, is an even number, a position feedforward amount without any equivalent time delay or lead can be obtained by taking the weighted average of average values obtained with a one-cycle shift with respect to the cycle concerned, so that more accurate control can be enjoyed.

I claim:

1. A feedforward control method for a servomotor in a servo-circuit, in which a numerical control device periodically distributes a move command to said servo-circuit in a distribution period, said numerical control device storing a plurality of move commands to be distributed in each said distribution period, said distribution period being divided by a number N, N being an integer greater than 1, to produce a plurality of position and speed loop processing periods being equal in duration, said method comprising the steps of:

(a) reading one of said stored move commands to be distributed from said numerical control device in a next distribution period relative to a move command being distributed in a current distribution period;

(b) dividing said one move command into a plurality of position and speed loop move commands, each of said plurality of position and speed loop move commands to be executed in a corresponding one of said plurality of position and speed loop processing periods;

(c) obtaining an average value of said plurality of position and speed loop move commands over said number N, with said average value centering around one of said plurality of position and speed loop move commands being currently executed in a current one of said position and speed loop processing periods;

(d) determining a position feedforward amount by multiplying said average value by a position feedforward coefficient; and (e) determining a corrected speed command for a speed loop process by adding said position feedforward amount to a speed command obtained in a position loop process.

2. A feedforward control method according to claim 1, wherein said step (c) for obtaining said average value includes the step of obtaining the average value of said plurality of position and speed move commands corresponding to a current position and speed loop period, N/2 consecutive past position and speed loop periods preceding said current period, and (N/2−1) consecutive position and speed loop periods subsequent to said current period, when said number N is an even number.

3. A feedforward control method according to claim 1, wherein said step (c) for obtaining said average value includes the step of obtaining the average value of said plurality of position and speed move commands corresponding to a current position and speed loop period, (N/2−1) consecutive past position and speed loop periods preceding said current period, and N/2 consecutive position and speed loop periods subsequent to said current period, when said number N is an even number.

4. A feedforward control method according to claim 1, wherein said step (c) for obtaining said average value includes the step of taking a weighted average of (a) a first average value of said plurality of position and speed move commands corresponding to a current position and speed loop period, N/2 consecutive past position and speed loop periods preceding said current period, and (N/2−1) consecutive position and speed loop periods subsequent to said current period, and (b) a second average value of said plurality of position and speed move commands corresponding to a current position and speed loop period, (N/2−1) consecutive past position and speed loop periods preceding said current period, and N/2 consecutive position and speed loop periods subsequent to said current period, when said number N is an even number.

5. A feedforward control method according to claim 4, further comprising the steps of:

(f) obtaining a differential value of one of (i) said first average value, (ii) said second average value, and (iii) said weighted average for a position and speed loop period subsequent to the position and speed loop period being currently executed by a predetermined number of periods;

(g) obtaining a speed feedforward amount by multiplying said differential value by a speed feedforward coefficient; and (h) obtaining a torque command for the servomotor by adding said speed feedforward amount to a torque command value obtained in the speed loop processing.

6. A feedforward control method for a servomotor in a servo-circuit, in which a numerical control device periodically distributes a move command to said servo-circuit in a distribution period, said numerical control device storing a plurality of move commands having been distributed and to be distributed in each said distribution period, said distribution period being divided by a number N, N being an integer greater than 1, to produce a plurality of position and speed loop processing periods being equal in duration, said method comprising the steps of:

(a) reading a first one of said stored move commands to be distributed from said numerical control device in a next distribution period relative to a move command being distributed in a current distribution period;

(b) reading a second one of said stored move commands having been distributed from said numerical control device in a previous distribution period relative to said move command being distributed in a current distribution period;

(c) obtaining an average value of a plurality of position and speed loop move commands over said number N, with said average value centering around one of said plurality of position and speed loop move commands being currently executed in a current one of said position and speed loop processing periods, based on said move command being currently executed, said first move command and said second move command;

(d) determining a position feedforward amount by multiplying said average value by a position feedforward coefficient; and (e) determining a corrected speed command for a speed loop process by adding said position feedforward amount to a speed command obtained in a position loop process.

7. A feedforward control method according to claim 6, wherein said step (c) for obtaining said average value includes the step of (1) adding to the average value in an accumulator a value obtained by subtracting the second move command from the currently executed move command in the position and speed loop periods ranging from the number N to (N/2−1), and adding to the value in the accumulator a value obtained by subtracting the currently executed move command, from the first move command, in the position and speed loop periods ranging from (N/2) the number N, when said N is an even number, and the step of (2) obtaining the average of said number N of said move commands for the individual position and speed loop periods by dividing the value stored in the accumulator by $N^2$.

8. A feedforward control method according to claim 7, wherein said step (c) for obtaining said average value further includes the step of (3) taking a weighted average of the average value of the move commands obtained in said step (2) and the average value of the second move command.

9. A feedforward control method according to claim 6, wherein said step (c) for obtaining said average value includes the step of (1) adding to the value in an accumulator a value obtained by subtracting the second move command from the currently executed move command, in the position and speed loop periods ranging from the number N to (N/2), and adding to the value in the accumulator a value obtained by subtracting the currently executed move command from the first move command, in the position and speed loop periods ranging from (N/2+1) to the number N, when said N is an even number, and the step of (2) obtaining the average of number N of said move commands for the individual position and speed loop periods by dividing the value stored in the accumulator by $N^2$.

10. A feedforward control method according to claim 9, further comprising the steps of:

(f) obtaining a differential value of said average value corresponding to a position and speed loop period subsequent to the position and speed loop period currently executed by a predetermined number of periods;

(g) obtaining a speed feedforward amount by multiplying said differential value by a speed feedforward coefficient; and (h) obtaining a torque command for the servomotor by adding said speed feedforward amount to a torque command value obtained in the speed loop processing.

* * * * *

UNITED STATES PATENT AND TRADEMARK OFFICE
CERTIFICATE OF CORRECTION

PATENT NO. : 5,448,145
DATED : September 5, 1995
INVENTOR(S) : Yasusuke IWASHITA It is certified that error appears in the above-indentified patent and that said Letters Patent is hereby corrected as shown below:

On the title page, item
[57] ABSTRACT, line 15 after "executed" delete "(S16)".

Column 1, line 9, delete "TECHNICAL FIELD"; and line 59, delete all the double spacing between words.

Column 7, line 17, insert a new paragraph beginning with "Table 1".

Signed and Sealed this

Twentieth Day of February, 1996

Attest:

BRUCE LEHMAN

Attesting Officer     Commissioner of Patents and Trademarks